US 9,948,765 B2

United States Patent
Cho

(10) Patent No.: US 9,948,765 B2
(45) Date of Patent: Apr. 17, 2018

(54) ELECTRONIC DEVICE WITH WEARABLE PART AND OPERATION METHOD THEREOF

(71) Applicant: Samsung Electronics Co., Ltd., Suwon-si (KR)

(72) Inventor: Kum-Hyun Cho, Suwon-si (KR)

(73) Assignee: SAMSUNG ELECTRONICS CO., LTD., Suwon-si (KR)

(\*) Notice: Subject to any disclaimer, the term of this patent is extended or adjusted under 35 U.S.C. 154(b) by 0 days.

(21) Appl. No.: 15/059,127

(22) Filed: Mar. 2, 2016

(65) Prior Publication Data
US 2016/0261733 A1 Sep. 8, 2016

(30) Foreign Application Priority Data

Mar. 2, 2015 (KR) .................. 10-2015-0029291

(51) Int. Cl.
*H04B 1/38* (2015.01)
*H04M 1/725* (2006.01)
*H04W 52/02* (2009.01)
*G04G 9/00* (2006.01)
*G04G 21/04* (2013.01)

(52) U.S. Cl.
CPC ...... *H04M 1/72569* (2013.01); *G04G 9/0064* (2013.01); *G04G 21/04* (2013.01); *H04M 1/72597* (2013.01); *H04W 52/0254* (2013.01); *Y02B 60/50* (2013.01)

(58) Field of Classification Search
CPC ............. H04W 88/02; H04M 1/72527; H04M 1/7253

USPC ........................ 455/557, 550.1, 575.1, 575.6
See application file for complete search history.

(56) References Cited

U.S. PATENT DOCUMENTS

| 5,889,737 A | 3/1999 | Alameh et al. |
| 2001/0008074 A1 | 7/2001 | Radley-Smith |
| 2003/0116596 A1 | 6/2003 | Terasawa |
| 2007/0064542 A1 | 3/2007 | Fukushima |
| 2014/0084033 A1 | 3/2014 | Kellond et al. |
| 2014/0139637 A1* | 5/2014 | Mistry .................. H04N 5/2252 348/46 |
| 2015/0227245 A1* | 8/2015 | Inagaki .................. G06F 3/0412 345/173 |

(Continued)

FOREIGN PATENT DOCUMENTS

| WO | WO 86/03645 | 6/1986 |
| WO | WO 2012/170162 A1 | 12/2012 |

OTHER PUBLICATIONS

Do H Y Multiple-Functional waist belt May 7, 2001, Korean.*
Extended European Search Report dated Jul. 5, 2016 in connection with European Application No. 16157530.3, 8 pages.

*Primary Examiner* — Nghi H Ly

(57) ABSTRACT

An electronic device includes a main body including at least one display, a wearable part connected to at least a part of the main body, a detector that detects information of a fastening position of the wearable part, and at least one processor that performs a function corresponding to the fastening position detected by the detector. A method for operating an electronic device including a wearable part connected to at least a part of the a main body includes detecting information of a fastening position of the wearable part, and performing a function corresponding to the detected fastening position. Various other embodiments are disclosed.

20 Claims, 14 Drawing Sheets

(56) References Cited

U.S. PATENT DOCUMENTS

| | | | |
|---|---|---|---|
| 2015/0317569 A1* | 11/2015 | Renaudie | G06Q 10/02 705/5 |
| 2016/0125677 A1* | 5/2016 | Williams | G06F 1/163 340/5.81 |
| 2016/0174158 A1* | 6/2016 | Vance | H04W 52/0251 455/418 |

* cited by examiner

ELECTRONIC DEVICE WITH WEARABLE PART AND OPERATION METHOD THEREOF

CROSS-REFERENCE TO RELATED APPLICATION AND CLAIM OF PRIORITY

The present application is related to and claims the priority under 35 U.S.C. § 119(a) to Korean Application Serial No. 10-2015-0029291, which was filed in the Korean Intellectual Property Office on Mar. 2, 2015, the entire content of which is hereby incorporated by reference.

TECHNICAL FIELD

Various embodiments of the present disclosure relate to an electronic device having a connection part and an operation method thereof.

BACKGROUND

Electronic devices have developed in a direction in which it is easy to carry by being gradually miniaturized and slim. The electronic devices may be carried by being stored in a user's pocket, and also may be worn on a head portion, an arm, or a wrist of a human body.

Electronic devices (e.g., a wearable electronic device) which are wearable on a human body or various structures may be solely used, and may be used by connecting to another electronic device (e.g., a smart phone) through wireless communication or wired communication.

SUMMARY

Electronic devices may include a wearable part to be wearable on a human body or various structures, wherein the wearable part may be referred to a connection part or a connection portion, etc. For example, in a case of an electronic device which can be worn on a wrist, the electronic device can be worn in a scheme in which a buckle disposed on a wearable part of the electronic device is fastened to at least one among a plurality of openings for adjusting a length formed in another wearable part. In this event, the same User Interface (UI) is displayed to users who wear the electronic device on a wrist, and a service differentiated for each user specific situation is not provided.

To address the above-discussed deficiencies, it is a primary object to provide various user interfaces or specific functions according to a fastening position of the wearable part in the electronic device including the wearable part.

An electronic device according to various embodiments of the present disclosure may include: a main body including at least one display, a wearable part connected to at least a part of the main body, a detector that detects information of a fastening position of the wearable part; and at least one processor that performs a specific function corresponding to the fastening position detected by the detector.

According to various embodiments of the present disclosure, there is a method of operating an electronic device including a wearable part connected to at least a part of a main body. The method may include: detecting information of a fastening position of the wearable part; and performing a specific function corresponding to the detected fastening position.

According to various embodiments of the present disclosure, various user interfaces or specific functions are provided according to a fastening position of a wearable part of an electronic device having the wearable part and various services differentiated according to a worn state of the electronic device are provided so that it is possible to improve usability.

Before undertaking the DETAILED DESCRIPTION below, it may be advantageous to set forth definitions of certain words and phrases used throughout this patent document: the terms "include" and "comprise," as well as derivatives thereof mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
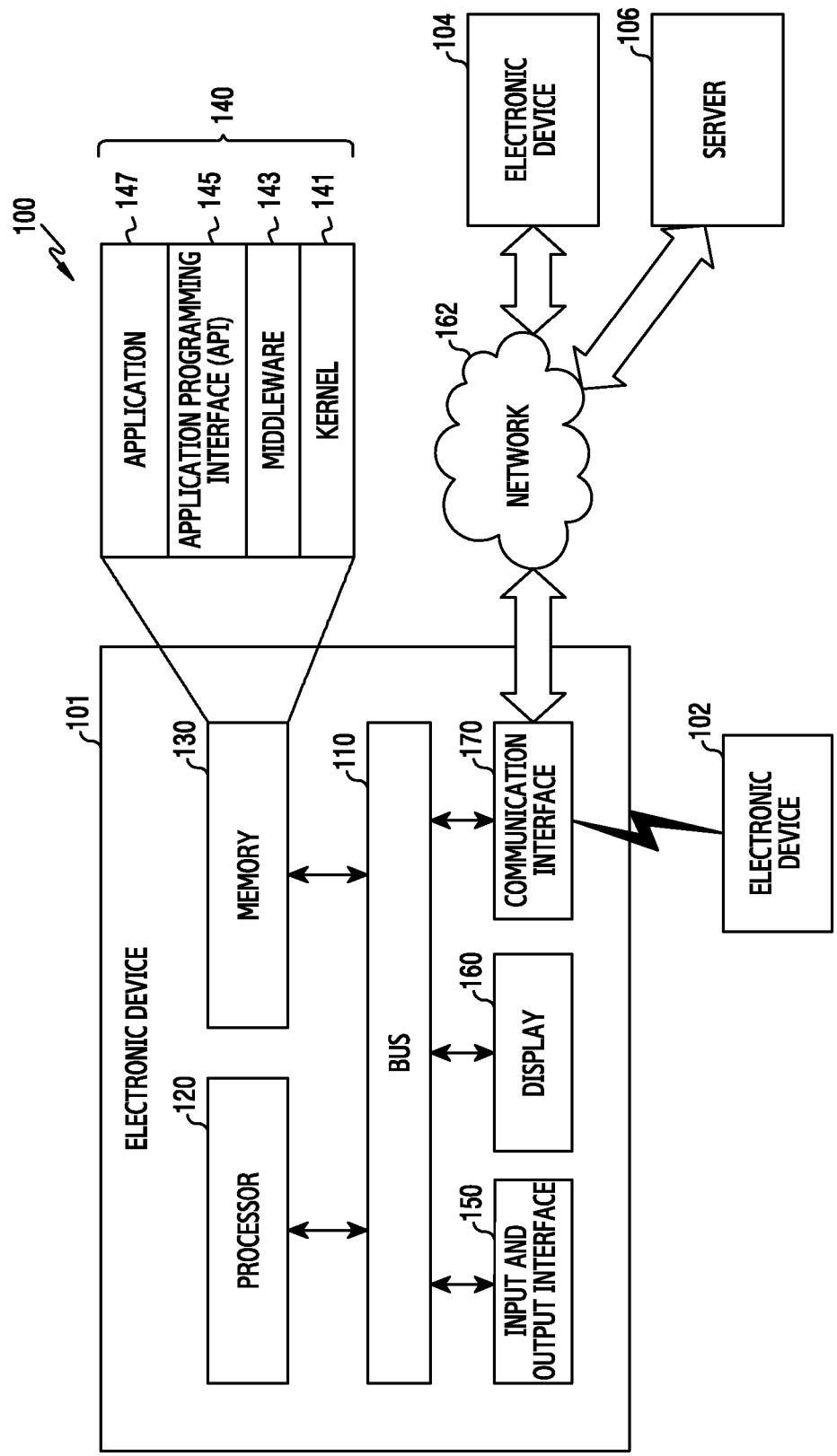
FIG. 1 illustrates a block diagram of an electronic device according to an exemplary embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure, In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" other element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or program module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device. For example, the electronic device according to various embodiments of the present disclosure can include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic accessory, an electronic tattoo, a smart mirror, or a smart watch).

In other embodiments, an electronic device can be a smart home appliance. For example, of such appliances can include at least one of a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device can include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Light bulb, various sensors, an electronic meter, a gas meter, a sprinkler, a fire alarm, a thermostat, a streetlamp, a toaster a sporting equipment, a hot-water tank, a heater, or a boiler and the like)

In certain embodiments, an electronic device can include at least one of: a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure can also include a combination of one or more of the above-mentioned devices. Further, it will be apparent to those skilled in the art that an electronic device according to various embodiments of the present disclosure is not limited to the above-mentioned devices.

Herein, the term "user" can indicate a person who uses an electronic device or a device (e.g., an artificial intelligence electronic device) that uses the electronic device. Below, a description can be made for a technology for selection of at least one area of a web page in an electronic device according to various exemplary embodiments of the present disclosure.

In various exemplary embodiments of the present disclosure below, a web page can represent contents of which at least a partial area consists of a plurality of tags (i.e., symbols indicating instructions) through programming languages such as HyperText Markup Language (HTML), eXtensible Markup Language (XML), etc. According to one exemplary embodiment, the web page can include contents (e.g., a word document and a Portable Document Format (PDF) document) constructed in a format of an electronic document.

FIG. 1 is a block diagram of an electronic device according to an embodiment of the present disclosure. Referring to FIG. 1, an electronic device 100 can include a bus 110, a processor 120, a memory 130, an input/output interface 150, a display 160, and a communication interface 170. According to various embodiments of the present disclosure, at least one of the components of the electronic device 100 can be omitted, or other components can be additionally included in the electronic device 100. The bus 110 can be a circuit that connects the processor 120, the memory 130, the input/output interface 150, the display 160, or the communication interface 170 and transmits communication (for example, control messages) between the above described components.

The processor 120 can construct a web page for displaying on the display 160 using a web page document stored in the memory 130 or provided from an external device (e.g., a first external electronic device 102, a second external electronic device 104, or a server 106) through the communication interface 170. For example, the processor 120 can parse the web page document (e.g., HTML document) to create a DOM tree for tags constructing the web page. The processor 120 can parse a style element of the web page to create a render tree. The processor 120 can control the display 160 to display the web page through rendering using the render tree.

According to one exemplary embodiment, if detecting an input for selection of at least a partial area of a web page through the input/output interface 150, the processor 120 can insert an attribute variable (e.g., a tag) for selecting and displaying, to a DOM tree for the area where the input is detected.

According to one exemplary embodiment, if detecting an input for selection of at least a partial area of a web page through the input/output interface 150, the processor 120 can control to update a render tree and display the area where the input is detected. To display the selection of a plurality of areas, the processor 120 can insert an attribute variable (e.g., a tag) for selecting and displaying, to a DOM tree for the area where the input is detected.

According to one exemplary embodiment, the processor 120 can store web page construction information (e.g., HTML information of an area where an input is detected) in a selection control module. For example, the processor 120 can store an attribute variable (e.g., a tag) for selecting and displaying and web page construction information in the selection control module. For instance, the selection control module can exist in at least one position of the internal or external of a web engine which consists of software constructing and driving a web page.

According to one exemplary embodiment, the processor 120 can extract web page construction information of at least one selected area, and construct a show page. For example, the processor 120 can search a DOM tree for an attribute variable for selecting and displaying, and identify at least one selected area. The processor 120 can extract the web page construction information of the at least one selected area, and create the show page. For example, the processor 120 can use the web page construction information of the at least one selected area stored in the selection control module, and create the show page. For instance, the show page can represent separate contents constructed to include at least a part of the web page construction information of the at least one area such that a user can identify the web page construction information of the at least one area selected by the user. The show page can include an electronic document including display data (e.g., image data, text data) included in at least one selected area, or a HTML-type document including HTML information (e.g., a tag, a script) included in the at least one selected area.

According to one exemplary embodiment, the processor 120 can reconstruct a web page to hide the displaying of at least one selected area on the web page displayed on the display 160.

The memory 130 can include a volatile memory and/or a non-volatile memory. The memory 130 can store, for example, instructions or data (e.g. image data) relevant to at least one other element of the electronic device 100. According to an embodiment, the memory 130 can store software and/or a program 140. The program 140 can include, for example, a kernel 141, middleware 143, an Application Programming Interface (API) 145, and/or application programs (or "applications") 147. At least some of the kernel 141, the middleware 143, and the API 145 can be referred to as an Operating System (OS).

The kernel 141 can control or manage system resources (e.g., the bus 110, the processor 120, or the memory 130) used for performing an operation or function implemented by the other programs (e.g., the middleware 143, the API 145, or the application programs 147). Furthermore, the kernel 141 can provide an interface through which the middleware 143, the API 145, or the application programs 147 can access the individual elements of the electronic device 100 to control or manage the system resources.

The middleware 143, for example, can function as an intermediary for allowing the API 145 or the application programs 147 to communicate with the kernel 141 to exchange data.

In addition, the middleware 143 can process one or more task requests received from the application programs 147 according to priorities thereof. For example, the middleware 143 can assign priorities for using the system resources (e.g., the bus 110, the processor 120, the memory 130, or the like) of the electronic device 100, to at least one of the application programs 147. For example, the middleware 143 can perform scheduling or loading balancing on the one or more task requests by processing the one or more task requests according to the priorities assigned thereto.

The API 145 is an interface through which the applications 147 control functions provided from the kernel 141 or the middleware 143, and can include, for example, at least one interface or function (e.g., instruction) for file control, window control, image processing, or text control.

The input/output interface 150, for example, can function as an interface that can transfer instructions or data input from a user or another external device to the other element(s) of the electronic device 100. Furthermore, the input/output interface 150 can output the instructions or data received from the other element(s) of the electronic device 100 to the user or another external device.

The display 160 can include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, can display various types of content (e.g., text, images, videos, icons, or symbols) for the user. The display 160 can include a touch screen and receive, for example, a touch, gesture, proximity, or hovering input sing an electronic pen or the user's body part. According to an embodiment, the display 160 can display a web page.

The communication interface 170, for example, can set communication between the electronic device 100 and an external device (e.g., the first external electronic device 102, the second external electronic device 104, or a server 106). For example, the communication interface 170 can be connected to a network 162 through wireless or wired communication to communicate with the external device (e.g., the second external electronic device 104 or the server 106).

The wireless communication can use at least one of, for example, Long Term Evolution (LTE®), LTE-Advance (LTE-A®), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication can include, for example, short range communication 164. The short-range communication 164 can include at least one of, for example, WiFi, Bluetooth, Near Field Communication (NFC), and Global Positioning System (GPS).

The wired communication can include at least one of, for example, a Universal Serial Bus (USB), a High Definition Multimedia Interface (HDMI), Recommended Standard-232 (RS-232), and a Plain Old Telephone Service (POTS).

The network 162 can include at least one of a communication network such as a computer network (e.g., a LAN or a WAN), the Internet, and a telephone network.

Each of the first and second external electronic devices 102 and 104 can be a device which is the same as or different from the electronic device 100. According to an embodiment, the server 106 can include a group of one or more servers. According to various embodiments, all or a part of operations performed in the electronic device 100 can be performed in the other electronic device or multiple electronic devices (for example, the external electronic device 102 or 104 or the server 106). According to an embodiment, when the electronic device 100 should perform some functions or services automatically or by a request, the electronic device 100 can make a request for performing at least some functions related to the functions or services to another device (for example, the external electronic device 102 or 104, or the server 106) instead of performing the functions or services by itself or additionally. Another electronic device (e.g., the external electronic device 102 or 104, or the server 106) can perform a function requested from the electronic device 100 or an additional function and transfer the performed result to the electronic device 100. The electronic device 100 can provide the requested function or service to another electronic device by processing the received result as it is or additionally. To this end, for example, cloud computing, distributed computing, or client-server computing technology can be used.

According to various exemplary embodiments of the present disclosure, the electronic device 100 can use at least one module operatively or physically separated from the processor 120 to construct a web page, and insert information about a selected area of the web page, and manage the information of the selected area.

Figure 2:
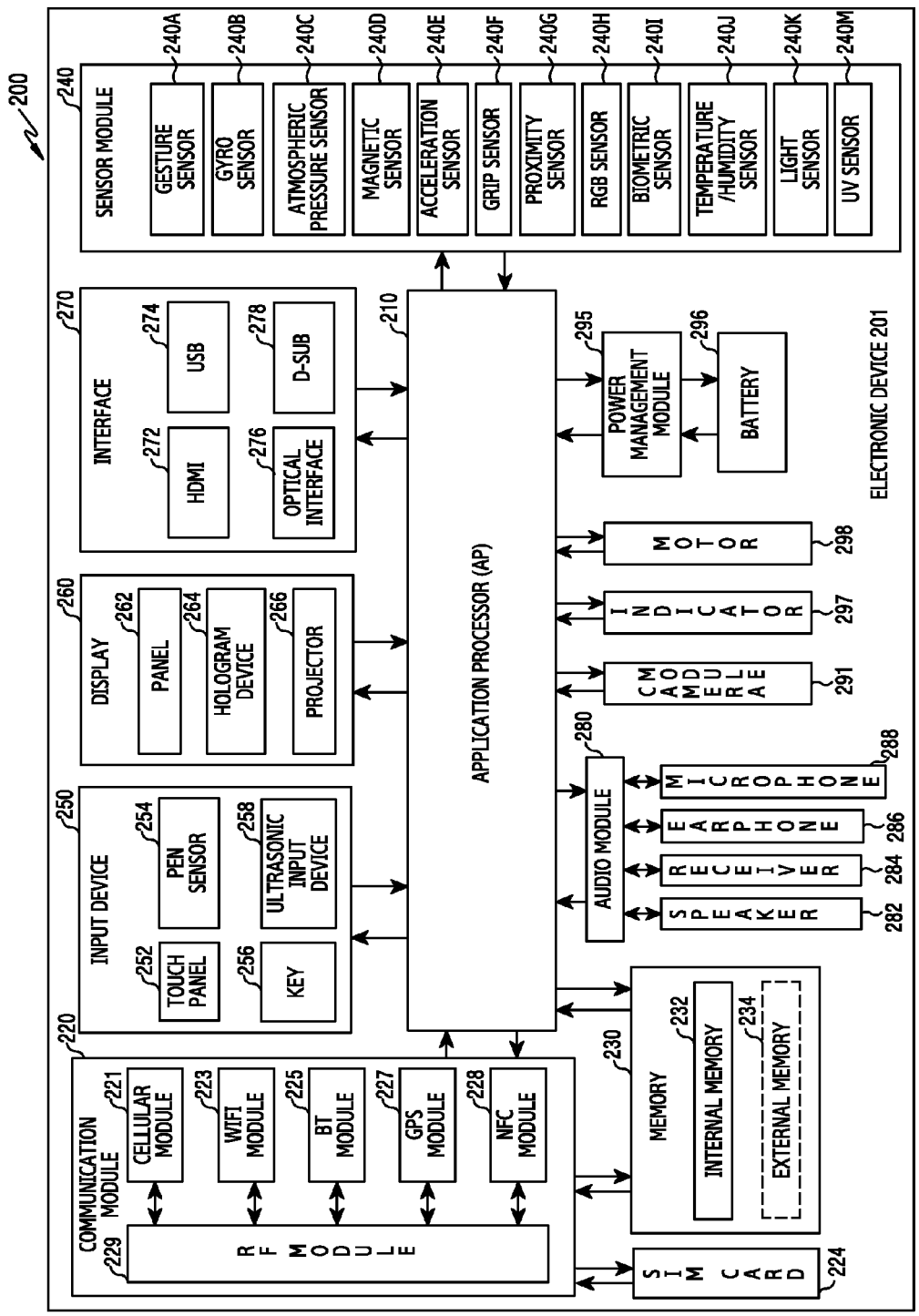
FIG. 2 illustrates a block diagram of a program module according to an exemplary embodiment of the present disclosure.

FIG. 2 shows a block diagram of a program module according to various embodiments of the present disclosure. According to an embodiment, the program module 210 (e.g., a program 140) can include an operating system for controlling resources associated with an electronic apparatus (for example, the electronic device 100) and/or various applications (for example, an application program 147) running on the operating system. The operating system can be, for example, Android®, iOS®, Windows®, Symbian®, Tizen®, Bada®, or the like.

The programming module 210 can include a kernel 220, middleware 230, an Application Programming Interface (API) 260, and/or an application 270. At least a part of the program module 210 can be preloaded on the electronic device or downloaded from the server.

The kernel 220 (for example, the kernel 141) can include, for example, a system resource manager 221 or a device driver 223. The system resource manager 221 can control, allocate, or collect the system resources. According to an embodiment, the system resource manager 221 can include a process management unit, a memory management unit, or a file system management unit. The device driver 223 can include, for example, a display driver, a camera driver, a Bluetooth driver, a shared-memory driver, a USB driver, a keypad driver, a Wi-Fi driver, an audio driver, or an Inter-Process Communication (IPC) driver. According to an embodiment, a WIFI driver of the kernel 220 can control at least one of an antenna mode or a transmission period of a network control message for use to transmit and receive signals to and from the communication interface 170.

The middleware 230 can provide, for example, a function commonly required by the applications 270 in common or provide various functions to the applications 270 through the API 260 so that the applications 270 can efficiently use limited system resources within the electronic device. According to an embodiment, the middleware 230 (for example, the middleware 143) can include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 can include, for example, a library module that a compiler uses to add new functions through a programming language while the application 270 is executed. The run time library 235 can perform input/output management, memory management, or a function for an arithmetic function.

The application manager 241 can manage, for example, a life cycle of at least one of the applications 270. The window manager 242 can manage Graphical User Interface (GUI) resources used by a screen. The multimedia manager 243 can grasp formats required for the reproduction of various media files, and can perform an encoding or decoding of the media file by using a codec suitable for the corresponding format. The resource manager 244 can manage resources such as a source code, a memory, and a storage space of at least one of the applications 270.

The power manager 245 can operate together with a Basic Input/Output System (BIOS) to manage a battery or power and can provide power information required for the operation of the electronic device. The database manager 246 can generate, search for, or change a database to be used by at least one of the applications 270. The package manager 247 can manage the installation or the updating of applications distributed in the form of package file.

The connectivity manager 248 can manage wireless connection of, for example, Wi-Fi or Bluetooth. The notification manager 249 can display or notify of an event such as an arrival message, promise, proximity notification, and the like in such a way that does not disturb a user. The location manager 250 can manage location information of the electronic device. The graphic manager 251 can manage graphic effects to be provided to a user and user interfaces related to the graphic effects. The security manager 252 can provide all security functions required for system security or user authentication.

According to an embodiment, the middleware 230 can control at least one of the transmission period of an antenna mode or a transmission period of a network control message for use to transmit and receive signals to and from the communication interface 170 by using at least one manager.

According to an embodiment, when the electronic device (for example, electronic device 100) has a call function, the middleware 230 can further include a telephony manager for managing a voice call function or a video call function of the electronic device.

The middleware 230 can include a middleware module for forming a combination of various functions of the aforementioned components. The middleware 230 can provide modules specialized according to types of operating systems in order to provide differentiated functions. Further, the middleware 230 can dynamically remove some of the existing components or add new components.

The API 260 (for example, the API 145) is, for example, a set of API programming functions, and a different configuration thereof can be provided according to an operating system. For example, with respect to each platform, one API set can be provided in a case of Android or iOS, and two or more API sets can be provided in a case of Tizen.

The applications 270 (for example, the application programs 147) can include, for example, one or more applications which can provide functions such as home 271, dialer 272, SMS/MMS 273, Instant Message (IM) 274, browser 275, camera 276, alarm 277, contacts 278, voice dialer 279, email 280, calendar 281, media player 282, album 283, clock 284, health care (for example, measure exercise quantity or blood sugar), or environment information (for example, atmospheric pressure, humidity, or temperature information).

According to an embodiment, the application 270 can include an application (hereinafter, for convenience of explanation, "Information Exchange application") that supports the exchange of information between the electronic device (for example, the electronic device 100) and the external electronic device. The application associated with exchanging information can include, for example, a notification relay application for notifying an external electronic device of certain information or a device management application for managing an external electronic device.

For example, a notification relay application can include a function of transferring the notification information generated by other applications of the electronic device (for example, SMS/MMS application, an e-mail application, a healthcare application, or an environmental information application, etc.) to the external electronic device. Further, the notification relay application can receive notification information from, for example, the external electronic device and provide the received notification information to the user. For example, the device management application can manage (e.g., install, delete, or update) at least one function (e.g., turning on/off the external electronic device itself (for some elements thereof) or adjusting the brightness (or resolution) of a display) of the external electronic device communicating with the electronic device, applications operating in the external electronic device, or services (e.g., a telephone call service or a message service) provided from the external electronic device.

According to an embodiment, the application 270 can include an application (for example, a health management application) specified according to an attribute (for example, as an attribute of the electronic device, the type of electronic device is a mobile medical equipment) of the external electronic device. According to an embodiment, the application 270 can include an application received from the external electronic device (for example, a server or an electronic device). According to an embodiment, the applications 270 can include a preloaded application or a third party application which can be downloaded from the server. The names of the elements of the program module 210, according to the embodiment illustrated in FIG. 2, can vary according to the type of operating system.

According to various embodiments, at least a part of the programming module 210 can be implemented in software, firmware, hardware, or a combination of two or more thereof. At least a part of the program module 210 can be implemented (e.g., executed), for example, by a processor (for example, by an application program). At least some of the programming module 210 can include, for example, a module, program, routine, sets of instructions, or process for performing one or more functions.

Figure 3:
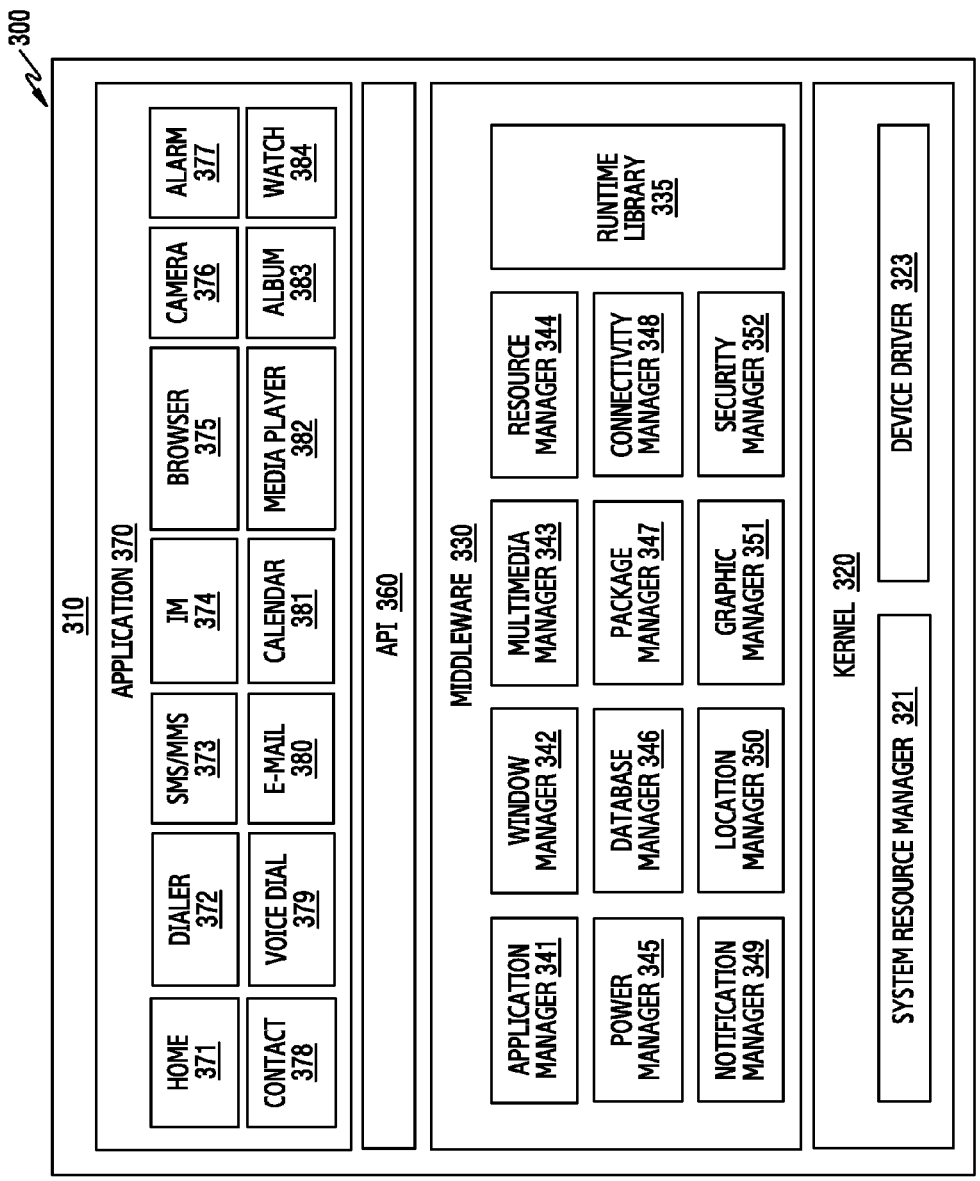
FIG. 3 illustrates a block diagram of an electronic device according to an exemplary embodiment of the present disclosure.

FIG. 3 illustrates a block diagram of an clear device according to an exemplary embodiment of the present disclosure. In the following description, the electronic device 300 can, for example, construct the whole or part of the electronic device 100 illustrated in FIG. 1.

Referring to FIG. 3, the electronic device 300 can include one or more Application Processors (APs) 310, a communication module 320, a Subscriber Identification Module (SIM) card 324, a memory 330, a sensor module 340, an input device 350, a display 360, an interface 370, an audio module 380, an image sensor module 391, a power management module 395, a battery 396, an indicator 397, or a motor 398.

The AP 310 can run an operating system or an application program to control a plurality of hardware or software constituent elements connected to the AP 310, and can perform processing and operation of various data including multimedia data. The AP 310 can be, for example, implemented as a System On Chip (SoC). According to one exemplary embodiment, the AP 310 can further include a Graphic Processing Unit (GPU) (not shown).

The communication module 320 (e.g., the communication interface 160) can perform data transmission/reception in communication between the electronic device 300 (e.g., the electronic device 101) and other electronic devices connected through a network. According to one exemplary embodiment, the communication module 320 can include a cellular module 321, a WiFi module 323, a BT module 325, a GPS module 327, an NFC module 328, and a Radio Frequency (RF) module 329.

The cellular module 321 can provide voice telephony, video telephony, a text service, or an Internet service, etc. through a telecommunication network (e.g., LTE, LTE-A, CDMA, WCDMA, UMTS, WiBro, or GSM, etc.). Also, the cellular module 321 can, for example, use a subscriber identification module (e.g., the SIM card 324) to perform electronic device distinction and authorization within the telecommunication network. According to one exemplary embodiment, the cellular module 321 can perform at least some of functions that the AP 310 can provide. For example, the cellular module 321 can perform at least one part of a multimedia control function.

According to one exemplary embodiment, the cellular module 321 can include a Communication Processor (CP). Also, the cellular module 321 can be, for example, implemented as a SoC. In FIG. 3, the constituent elements such as the cellular module (e.g., the communication processor), the memory 330, or the power management module 395, etc. are illustrated as constituent elements different from the AP 310 but, according to one exemplary embodiment, the AP 310 can be implemented to include at least some (e.g., the cellular module 321) of the aforementioned constituent elements.

According to one exemplary embodiment, the AP 310 or the cellular module 321 (e.g., the communication processor) can load an instruction or data, which is received from a non-volatile memory connected to each or at least one of other constituent elements, to a volatile memory and process the loaded instruction or data. Also, the AP 310 or the cellular module 321 can store in the non-volatile memory data, which is received from at least one of the other constituent elements or is generated by at least one of the other constituent elements.

The WiFi module 323, the BT module 325, the GPS module 327 or the NFC module 328 each can include, for example, a processor for processing data transmitted/received through the corresponding module. In FIG. 3, the cellular module 321, the WiFi module 323, the BT module 325, the GPS module 327 or the NFC module 328 is each illustrated as a separate block but, according to one exemplary embodiment, at least some (e.g., two or more) of the cellular module 321, the WiFi module 323, the BT module 325, the GPS module 327 or the NFC module 328 can be included within one IC or IC package. For example, at least some (e.g., a communication processor corresponding to the cellular module 321 and a WiFi processor corresponding to the WiFi module 323) of the processors corresponding to the cellular module 321, the WiFi module 323, the BT module 325, the GPS module 327 or the NFC module 328 can be implemented as one SoC.

The RF module 329 can perform transmission/reception of data, for example, transmission/reception of an RF signal. Though not illustrated, the RF module 329 can include, for example, a transceiver, a Power Amplifier Module (PAM), a frequency filter, or a Low Noise Amplifier (LNA), etc. Also, the RF module 329 can further include a component for transmitting/receiving an electromagnetic wave on a free space in wireless communication, for example, a conductor or a conductive wire, etc. FIG. 3 illustrates that the cellular module 321, the WiFi module 323, the BT module 325, the GPS module 327 and the NFC module 328 share one RF module 329 with one another but, according to one exemplary embodiment, at least one of the cellular module 321, the WiFi module 323, the BT module 325, the GPS module 327 or the NFC module 328 can perform transmission/reception of an RF signal through a separate RF module.

According to one exemplary embodiment, the RF module 329 can include at least one antenna among a main antenna and a sub antenna which are operatively connected with the electronic device 300. The communication module 320 can use the main antenna and the sub antenna to support a Multiple Input Multiple Output (MIMO) such as diversity, etc.

The SIM card 324 can be a card including a subscriber identification module, and can be inserted into a slot provided in a specific position of the electronic device 300. The SIM card 324 can include unique identification information (e.g., an integrated Circuit Card ID (ICCID)) or subscriber information (e.g., an International Mobile Subscriber Identity (IMSI)).

The memory 330 can include an internal memory 332 or an external memory 334. The internal memory 332 can include, for example, at least one of a volatile memory (for example, a Dynamic Random Access Memory (DRAM), a Static RAM (SRAM) and a Synchronous Dynamic RAM (SDRAM)) or a non-volatile memory (for example, a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, and a Not OR (NOR) flash memory).

According to one exemplary embodiment, the internal memory 332 can be a Solid State Drive (SSD). The external memory 334 can further include a flash drive, for example, Compact Flash (CF), Secure Digital (SD), micro-SD, mini-SD, extreme Digital (xD), or a memory stick, etc. The external memory 334 can be operatively connected with the electronic device 300 through various interfaces. According to one exemplary embodiment, the electronic device 300 can further include a storage device (or a storage media) such as a hard drive.

The sensor module 340 can measure a physical quantity or sense an activation state of the electronic device 300, and convert measured or sensed information into an electric signal. The sensor module 340 can include, for example, at least one of a gesture sensor 340A, a gyro sensor 340B, an air pressure sensor 340C, a magnetic sensor 340D, an acceleration sensor 340E, a grip sensor 340F, a proximity sensor 340G, a color sensor 340H (e.g., a Red, Green, Blue (RGB) sensor), a bio-physical sensor 340I, a temperature/humidity sensor 340J, an illumination sensor 340K, or a Ultraviolet (UV) sensor 340M. Additionally or alternatively, the sensor module 340 can include, for example, an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), or a fingerprint sensor (not shown), etc. The sensor module 340 can further include a control circuit for controlling at least one or more sensors belonging therein.

The input device 350 can include a touch panel 352, a (digital) pen sensor 354, a key 356, or an ultrasonic input device 358. The touch panel 352 can, for example, detect touch input in at least one of a capacitive overlay scheme, a pressure sensitive scheme, an infrared beam scheme, or an acoustic wave scheme. Also, the touch panel 352 can further include a control circuit as well. In a case of the capacitive overlay scheme, physical contact or proximity detection is possible. The touch panel 352 can further include a tactile layer as well. In this case, the touch panel 352 can provide a tactile response to a user.

The (digital) pen sensor 354 can be implemented in the same or similar method to receiving a user's touch input or by using a separate sheet for detection. The key 356 can include, for example, a physical button, an optical key, or a keypad. The ultrasonic input device 358 is a device capable of identifying data by sensing a sound wave in the electronic device 300 through an input tool generating an ultrasonic signal, and enables wireless detection. According to one exemplary embodiment, the electronic device 300 can also use the communication module 320 to receive a user input from an external device (e.g., a computer or a server) connected with this.

The display 360 (e.g., the display 160) can include a panel 362, a hologram device 364, or a projector 366. The panel 362 can be, for example, a Liquid Crystal Display (LCD) or an Active-Matrix Organic Light-Emitting Diode (AMO-LED), etc. The panel 362 can be, for example, implemented to be flexible, transparent, or wearable. The panel 362 can be constructed as one module along with the touch panel 352 as well. The hologram device 364 can use interference of light to show a three-dimensional image in the air. The projector 366 can project light to a screen to display an image. The screen can be, for example, located inside or outside the electronic device 300. According to one exemplary embodiment, the display 360 can further include a control circuit for controlling the panel 362, the hologram device 364, or the projector 366.

The interface 370 can include, for example, a HDMI 372, a USB 374, an optical interface 376, or a D-subminiature (D-sub) 378. Additionally or alternatively, the interface 370 can include, for example, a Mobile High-definition Link (MHL) interface, a Secure Digital (SD) card/Multi Media Card (MMC) interface or an Infrared Data Association (IrDA) standard interface.

The audio module 380 can convert a voice and an electric signal interactively. The audio module 380 can, for example, process sound information which is inputted or outputted through a speaker 382, a receiver 384, an earphone 386, or the microphone 388, etc.

The image sensor module 391 is a device able to take a still picture and a moving picture. According to one exemplary embodiment, the image sensor module 391 can include one or more image sensors (e.g., a front sensor or a rear sensor lens (not shown), an Image Signal Processor (ISP) (not shown), or a flash (not shown) (e.g., a Light Emitting Diode (LED) or a xenon lamp).

The power management module 395 can manage electric power of the electronic device 300. Though not illustrated, the power management module 395 can include, for example, a Power Management Integrated Circuit (PMIC), a charger IC, or a battery or fuel gauge.

The PMIC can be, for example, mounted within an integrated circuit or a SoC semiconductor. A charging scheme can be divided into a wired charging scheme and a wireless charging scheme. The charger can charge the battery 396, and can prevent the inflow of overvoltage or overcurrent from an electric charger. According to one exemplary embodiment, the charger IC can include a charger IC for at least one of the wired charging scheme or the wireless charging scheme. The wireless charging scheme can, for example, be a magnetic resonance scheme, a magnetic induction scheme, or an electromagnetic wave scheme, etc. A supplementary circuit for wireless charging, for example, a circuit such as a coil loop, a resonance circuit, or a rectifier can be added.

The battery gauge can, for example, measure a level of the battery 396, a voltage during charging, a current or a temperature. The battery 396 can generate or store electricity, and use the stored or generated electricity to supply power to the electronic device 300. The battery 396 can include, for example, a rechargeable battery or a solar battery.

The indicator 397 can display a specific status of the electronic device 300 or one part (e.g., the AP 310) thereof, for example a booting state, a message state, or a charging state, etc. The motor 398 can convert an electric signal into a mechanical vibration. Though not illustrated, the electronic device 300 can include a processing device (e.g., a GPU) for mobile TV support. The processing device for mobile TV support can, for example, process media data according to the standards of Digital Multimedia Broadcasting (DMB), Digital Video Broadcasting (DVB), or a media flow.

According to various exemplary embodiments of the present disclosure, an electronic device can insert an attribute variable (e.g., a tag) for selecting and displaying to at least one area of a web page selected by input information, thereby displaying a plurality of areas selected by a user on the web page.

According to various exemplary embodiments of the present disclosure, the electronic device can extract and store construction information of the at least partial area of the web page to which the attribute variable for selecting and displaying is inserted, thereby separately managing areas selected by the user.

The term "module" as used herein can, for example, mean a unit including one of hardware, software, and firmware or a combination of two or more of them. The "module" can be interchangeably used with, for example, the term "unit", "logic", "logical block", "component", or "circuit". The "module" can be a minimum unit of an integrated component element or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure can be implemented by a command stored in a computer-readable storage medium in a programming module form. The instruction, when executed by a processor (e.g., the processor 120), can cause the one or more processors to execute the function corresponding to the instruction. The computer-readable storage medium can be, for example, the memory 30.

The computer readable recoding medium can include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM) a Random Access Memory (RAM), a flash memory), and the like. In addition, the program instructions can include high class language codes, which can be executed in a computer by using an interpreter, as well as machine codes made by a compiler. The aforementioned hardware device can be configured to operate as one or more software modules in order to perform the operation of the present disclosure, and vice versa.

The programming module according to the present disclosure can include one or more of the aforementioned components or can further include other additional components, or some of the aforementioned components can be omitted. Operations executed by a module, a programming module, or other component elements according to various embodiments of the present disclosure can be executed sequentially, in parallel, repeatedly, or in a heuristic manner. Further, some operations can be executed according to another order or can be omitted, or other operations can be added. Further, the embodiments disclosed in this document are only for the description and understanding of technical contents and do not limit the scope of the present disclosure. Accordingly, the scope of the present disclosure should be construed as including all modifications or various other embodiments based on the technical idea of the present disclosure.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

Figure 4A:
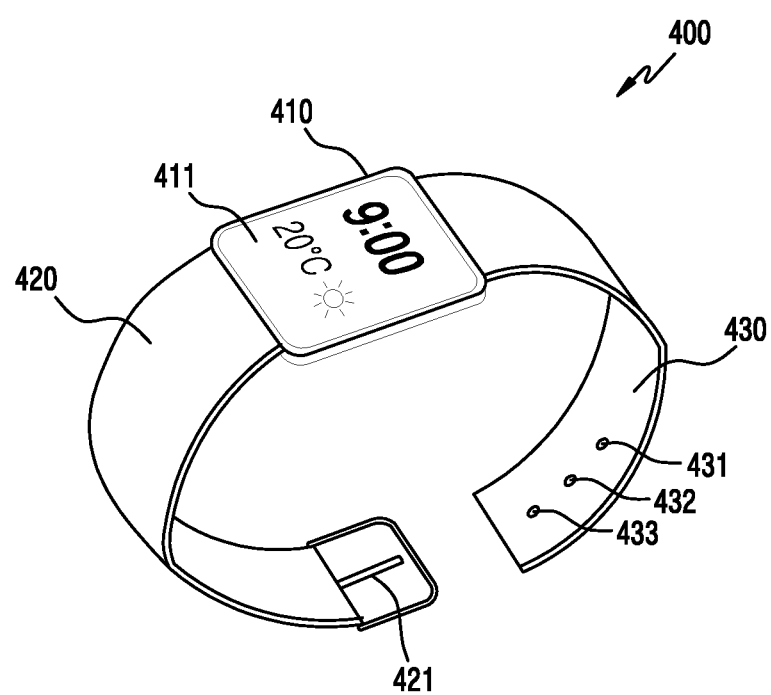
FIG. 4A is a front perspective view of an electronic device according to various embodiments of the present disclosure.
Figure 4B:
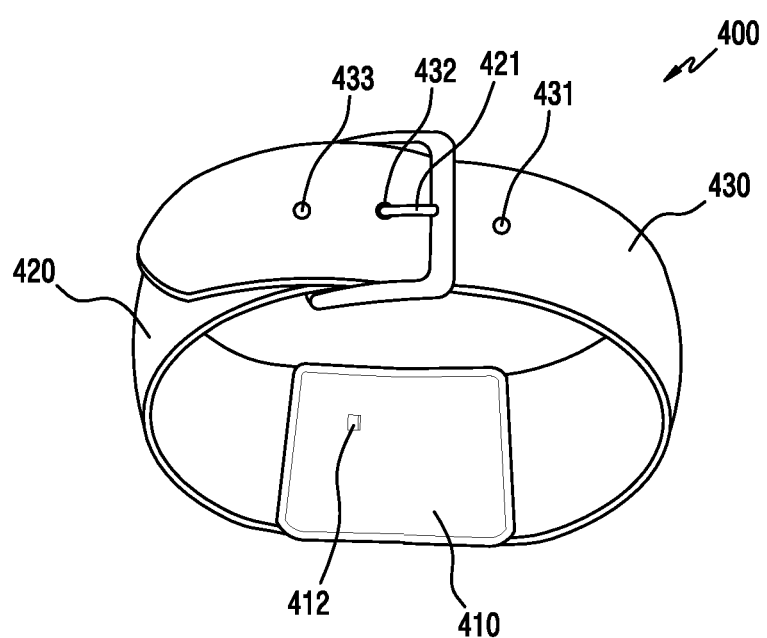
FIG. 4B is a rear perspective view of an electronic device according to various embodiments of the present disclosure.
Figure 4C:
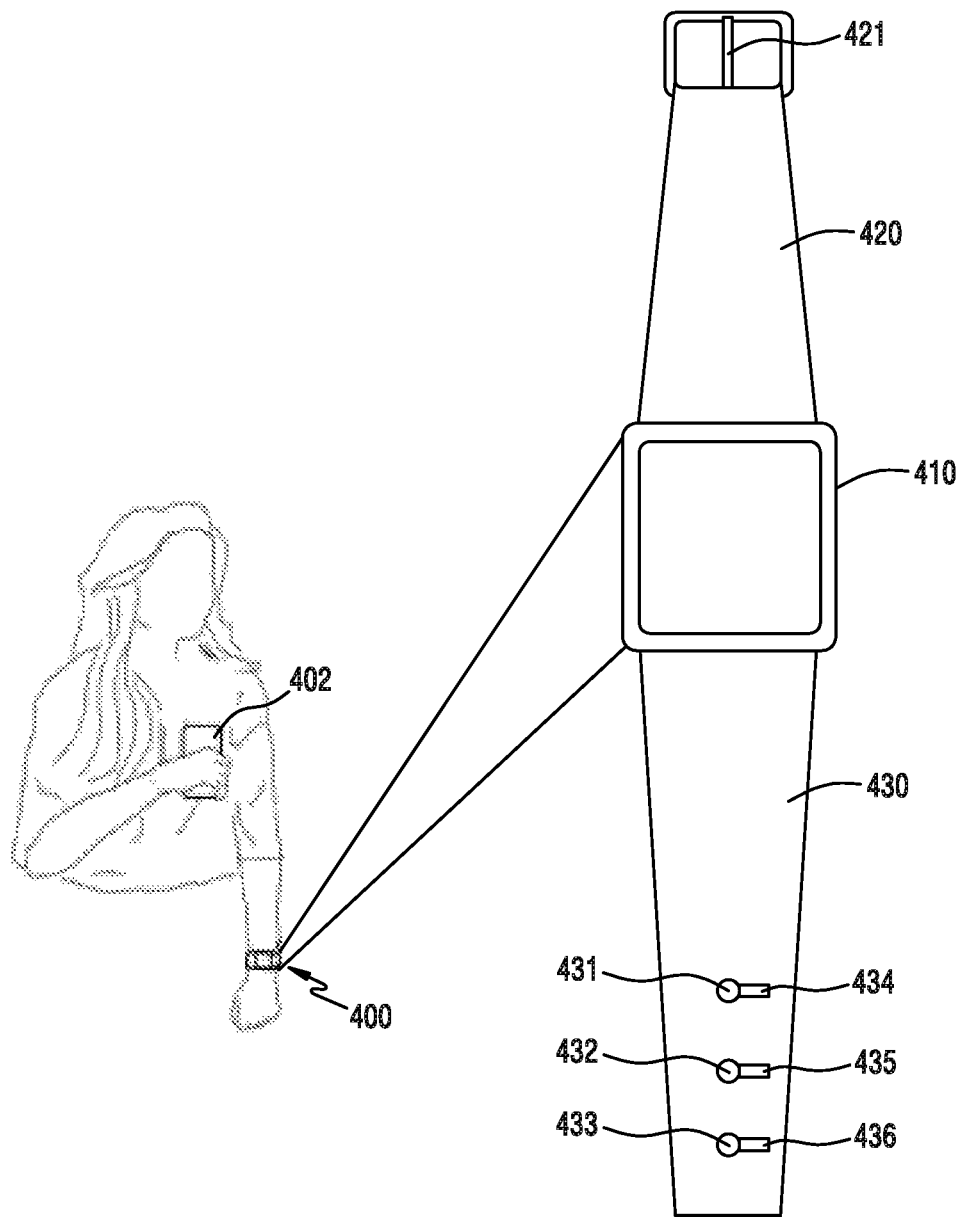
FIG. 4C illustrates sensor devices for detecting sensor information of an electronic device according to various embodiments of the present disclosure.

FIG. 4A is a front perspective view of an electronic device according to various embodiments of the present disclosure. FIG. 4B is a rear perspective view of an electronic device according to various embodiments of the present disclosure. FIG. 4C illustrates sensor devices for detecting sensor information of an electronic device according to various embodiments of the present disclosure.

In various embodiments of the present disclosure, a smart watch which can be worn on a wrist of a human body is disclosed and it will be described. Hereinafter, an electronic device can correspond to a device to which a strap is attached, such as a watch.

Referring to FIGS. 4A to 4C, an electronic device 400 can include a main body 410, and a first portion of wearable part 420 and a second portion of wearable part 430 which are connected to both ends of the main body 410, respectively and have a predetermined length.

According to an embodiment, a display device 411 can be installed in the main body 410, and sub-units for using a function of the electronic device 400 can be installed in at least one among the main body 410, the first portion of wearable part 420, and the second portion of wearable part 430.

According to an embodiment, the display device 411 can display an electric signal received from a processor (e.g., processor 120) as an image such as a text, a graphic, and a video. Herein, the display device 411 can employ a touchscreen device which can perform data input/output together.

According to an embodiment, the sub-units can include a camera device (not shown) for photographing a subject, a microphone device (not shown) for receiving an input of a sound, a speaker device (not shown) for outputting a sound, and a sensor device (not shown) (e.g., an illumination sensor, a heart rate detection sensor, a temperature sensor, a fingerprint recognition sensor, a movement detection sensor, or the like) for detecting a state of a human body and a worn state of the electronic device 400.

According to an embodiment, a scheme for fastening the first portion of wearable part 420 and the second portion of wearable part 430 of the electronic device 400 can be a scheme in which a fixing pole 421 of a buckle of the first portion of wearable part 420 is fastened to openings 431, 432, and 433 for adjusting a length of the second portion of wearable part 430. Although three openings for adjusting a length have been described in FIGS. 4A to 4C, this is not limited thereto and a plurality of openings for adjusting the length can be formed.

According to an embodiment, the electronic device 400 can determine a worn state of the electronic device 400. For example, when the electronic device 400 corresponds to a watch, the fixing pole 421 of the buckle and each of the openings 431, 432, and 433 for adjusting the length can be connected to the main body 410 of the electronic device 400 through a conductive wire mounted in a predetermined position of the second portion of wearable part 430.

According to an embodiment, when each of openings (e.g., 431, 432, or 433) for adjusting a length, which are formed in the second portion of wearable part 430 of the electronic device 400, is fastened to the fixing pole 421, it can be designed that a predetermined current amount is allowed to flow to the each of openings for adjusting the length (e.g., configure a predetermined resistance value to the each of openings for adjusting the length) or a predetermined fastening signal (e.g., an electric signal) is allowed to be generated. Further, it is possible to detect fastening of the buckle to each of openings (e.g., 431, 432, or 433) for adjusting the length, by a module (e.g., a module for detecting a fastening state through a resistance value or a ground component) which can detect whether the buckle is correctly fastened to a buckle portion.

According to an embodiment, when the fixing pole 421 is fastened to one opening for adjusting a length, the electronic device 400 can obtain a predetermined current amount of the opening for adjusting the length or information on a worn state of the electronic device 400 through a fastening signal. For example, the electronic device 400 can transmit the obtained information of the worn state to an external electronic device 402. Herein, the electronic device 400 and the external electronic device 402 can be connected in a short-distance wireless communication scheme. The external electronic device 402 can determine a user of the electronic device 400 or the external electronic device 402 based on the information of the worn state received from the electronic device 400.

According to an embodiment, the electronic device 400 can change a user interface according to the worn state information of the electronic device 400 in a state of being connected to the external electronic device 402. In this event, the electronic device 400 can change a user interface of the external electronic device 402 together, based on a change of a user interface of the electronic device 400.

According to an embodiment, the electronic device 400 can execute a preconfigured function (e.g., at least one application) according to the information of the worn state of the electronic device 400 in a state of being connected to the external electronic device 402. In this event, the electronic device 400 can make a control to also execute, in the external electronic device 402, a function which is similar or related to a fu lion executed in the electronic device 400.

According to an embodiment, the electronic device 400 can determine a user profile based on the obtained information of worn state. Herein, the user profile can include various pieces of profile information such as a name, a contact number, an age, a home address, and an office address of a user of the electronic device 400, a UI for each user, or guardian information (e.g., a name, a contact number, and a home address of the guardian) of a user. For example, as shown in FIG. 4B, when an opening 432 for adjusting a length of the second portion of wearable part 430 is fastened to a fixing pole 421, the electronic device 400 can search for a predetermined user profile in a database of the electronic device 400 or a database of a server (e.g., a server 106) based on the obtained current amount or a fastening signal. For example, when the obtained current amount or the fastening signal satisfies a first user's profile of the database stored in the electronic device 400 or the server, the electronic device 400 can change a setting of the electronic device 400 based on at least one of information on the first user's profile. Further, the electronic device 400 can transmit the information on the first user's profile to the external electronic device 402.

According to an embodiment, the electronic device 400 can determine a user's profile by further including the obtained current amount, the fastening signal, and sensor information obtained through one or more sensors.

According to an embodiment, the electronic device 400 can obtain information obtained by fastening the fixing pole of the buckle and the opening for adjusting the length, and also information on a worn state of the electronic device 400 through one or more various sensors connected to the electronic device 400. For example, sensors attached to the electronic device 400 can include one or more among a proximity sensor, a touch sensor, a grip sensor, a wave (pulse or pulse wave) detection sensor, a temperature detection sensor, a fingerprint recognition sensor, and a tension sensor, and obtain the state information of the electronic device 400 (e.g., information of a worn state) through the attached sensors.

According to an embodiment, the electronic device 400 can include a proximity sensor 434 in a predetermined position of the main body 410 or the wearable part (the first portion of wearable part 420 or the second portion of wearable part 430). For example, when the electronic device 400 has been worn, the electronic device 400 can obtain a signal corresponding to a state in which the electronic device 400 is worn, through the proximity sensor 434.

According to an embodiment, the electronic device 400 can include a temperature sensor 435 in a predetermined position of the main body 410 or the wearable part (the first portion of wearable part 420 or the second portion of wearable part 430). For example, when the electronic device 400 has been worn, the electronic device 400 can obtain temperature information of an object on which the electronic device 400 is worn, through the temperature sensor 435.

According to an embodiment, the electronic device 400 can include a grip sensor 436 in a predetermined position of the main body 410 or the wearable part (the first portion of wearable part 420 or the second portion of wearable part 430). For example, when the electronic device 400 is worn, the electronic device 400 can obtain information on the state where the electronic device 400 is in contact with the object on which the electronic device 400 is worn, through the grip sensor 436. The grip sensor 436 can obtain an electromagnetic signal pattern having a characteristic of the object in contact.

According to an embodiment, the electronic device 400 can determine a security level corresponding to user information (e.g., a user profile) predetermined through the one or more pieces of sensor information obtained from the electronic device 400 or the obtained sensor information. The electronic device 400 can additionally apply a step of providing a content according to the determined user information or security level and provide a security service of the electronic device 400.

According to an embodiment, as shown in FIG. 4C, the sensor devices (e.g., 434, 435, and 436) of the electronic device 400 can be installed in a position which is predetermined with reference to the each of the openings (e.g., 431, 432, and 433) for adjusting the length.

According to an embodiment, when the fixing pole 421 of the buckle is fastened to one or more openings for adjusting the length, which are included in the second portion of wearable part 430, in the electronic device 400, the detector can transmit a predetermined signal in the opening for adjusting the length to the main body 410 of the electronic device 400 through a predetermined conductive wire of the wearable part. The electronic device 400 can determine security information corresponding to the predetermined signal obtained by the detector and can transmit the security information to the external electronic device 402 connected with network communication. The external electronic device 402 can control a security degree of a content provided by the external electronic device 402 with reference to the obtained security information.

According to an embodiment, the electronic device 400 can include an electric connection means. The electric connection means can electronically connect the first portion of wearable part 420, the second portion of wearable part 430, and the main body 410. The electric connection means can correspond to a Flexible Printed Circuit (FPC) or a cable.

According to an embodiment, the electronic device 400 can include a detector for detecting information of a fastening position of the wearable part, and at least one processor performing a specific function corresponding to a fastening position detected by the detector. Herein, the detector can include the fixing pole 421 of the electronic device 400 or at least one among the openings 431, 432, and 433 for adjusting the length.

According to an embodiment, the detector can include a fixing pole arranged in at least one connection part of the electronic device 400.

For example, the fixing pole can include a resistance sensor. For example, the wearable part can include a plurality of openings for adjusting a length having different resistance values, and a resistance sensor can detect a resistance value of an opening for adjusting the length detected when the fixing pole is fastened to the opening for adjusting the length.

For example, the fixing pole can include a capacitance measurement sensor. For example, the wearable part can include a plurality of openings for adjusting a length having different capacitances, and the capacitance measurement sensor can detect a capacitance of the opening for adjusting the length detected when the fixing pole is fastened to the opening for adjusting the length.

For example, the fixing pole can include a hall sensor. For example, the wearable part can include a plurality of openings for adjusting a length having magnets with different magnetic strengths, and the hall sensor can detect the magnetic strength of the magnet of the opening for adjusting the length detected when the fixing pole is fastened to the opening for adjusting the length.

According to various embodiments, the detector can include one or more openings for adjusting the length, and the one or more openings for adjusting the length can include at least one among the resistance sensor, the capacitance measurement sensor, and the hall sensor. For example, the one or more openings for adjusting the length can detect at least one among a resistance value, capacitance, and magnetic strength of the fixing pole.

Figure 5:
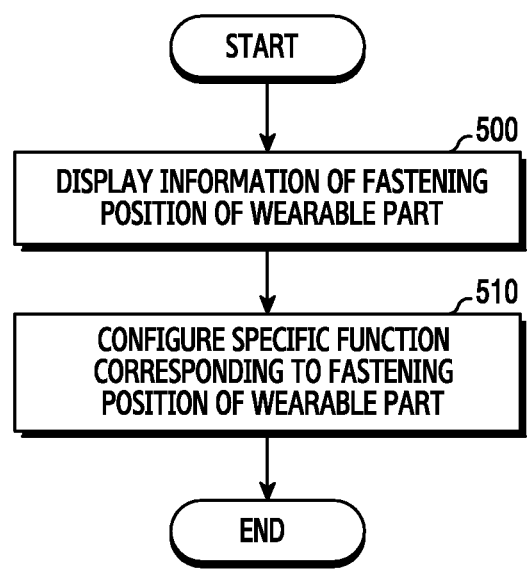
FIG. 5 is a flowchart illustrating a method of configuring a specific function corresponding to a fastening position of a wearable part of an electronic device according to various embodiments of the present disclosure.

FIG. 5 is a flowchart illustrating a method of configuring a specific function corresponding to a fastening position of a wearable part of an electronic device according to various embodiments of the present disclosure. Referring to FIG. 5, in operation 500, an electronic device can display information of a fastening position of a wearable part.

Figure 6:
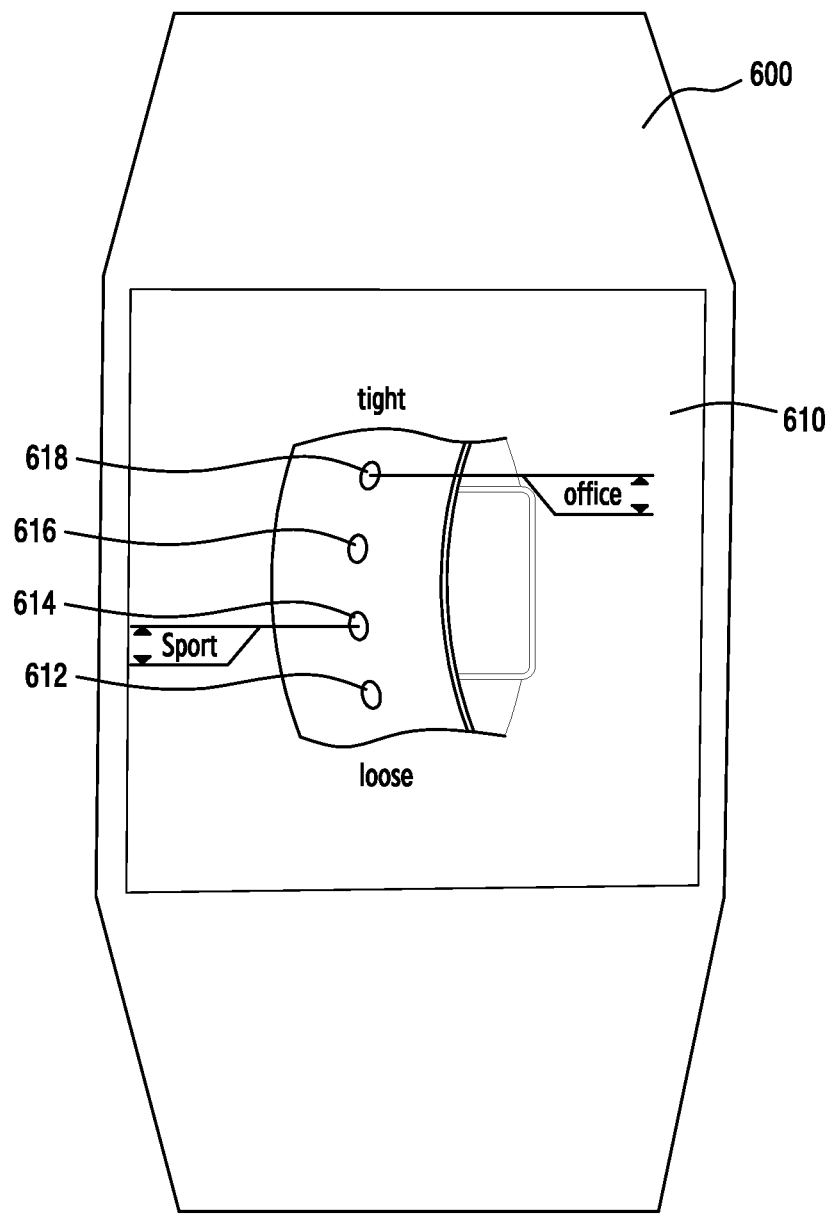
FIG. 6 illustrates an example of a screen configuration for configuring a function executed depending on a fastening position of a wearable part according to various embodiments of the present disclosure.

For example, as shown in FIG. 6, an electronic device 600 can display a configuration screen 610 for configuring an application executed according to the fastening position of the wearable part. For example, a user can select, a desired fastening position by operating (e.g., touching or dragging) the configuration screen 610.

In operation 510, the electronic device can configure a specific function corresponding to the fastening position of the wearable part. For example, as shown in FIG. 6, the electronic device 600 can configure a specific function corresponding to the fastening position of the wearable part through a user input from the configuration screen 610. For example, the electronic device 600 can select at least one among a plurality of openings (e.g., 612, 614, 616, and 618) for adjusting a length of the wearable part and then configure a desired function or application to be executed.

For example, when a fixing pole of the electronic device 600 is fastened to a first position of the wearable part, the electronic device 600 can determine that a child wears the electronic device 600, and configure a user interface and an application which are related to the child. Further, when the fixing pole of the electronic device 600 is fastened to a second position, the electronic device 600 can determine that an adult wears the electronic device 600, and configure a user interface and an application which are related to the adult. For example, an application can include an application (e.g., a health care application) related to a sport and an application related to an office. However, it is not limited thereto, and the application can be various applications, such as a meeting, a schedule, weather, a map, a travel, and a location search, included in the electronic device.

Figure 7:
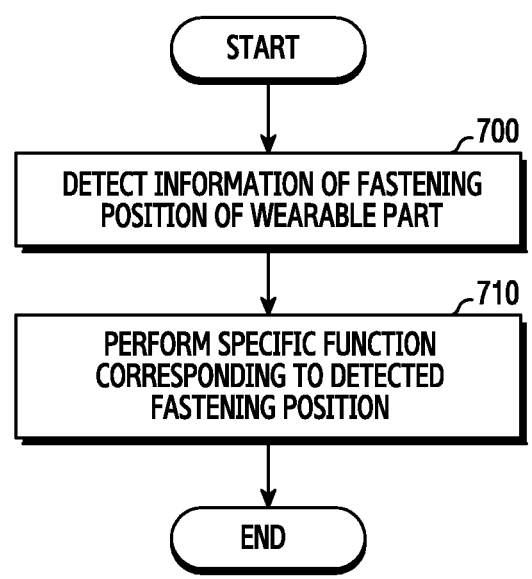
FIG. 7 is a flowchart illustrating a method of performing a specific function corresponding to a fastening position of a wearable part of an electronic device according to various embodiments of the present disclosure.

FIG. 7 is a flowchart illustrating a method of performing a specific function corresponding to a fastening position of a wearable part of an electronic device according to various embodiments of the present disclosure. Referring to FIG. 7, in operation 700, an electronic device can detect information of a fastening position of a wearable part. For example, the electronic device can detect a current amount or a fastening signal when a fixing pole of the wearable part is fastened to an opening for adjusting a length.

In operation 710, the electronic device can perform a specific function corresponding to a detected fastening position. For example, when a fixing pole of the electronic device is fastened to a first position of the wearable part, the electronic device can determine that a child wears the electronic device, display a user interface related to the child, and execute an application. Further, when the fixing pole of the electronic device is fastened to a second position of the wearable part, the electronic device can determine that an adult wears the electronic device, display a user interface related to the adult, and execute an application.

Figure 8A:
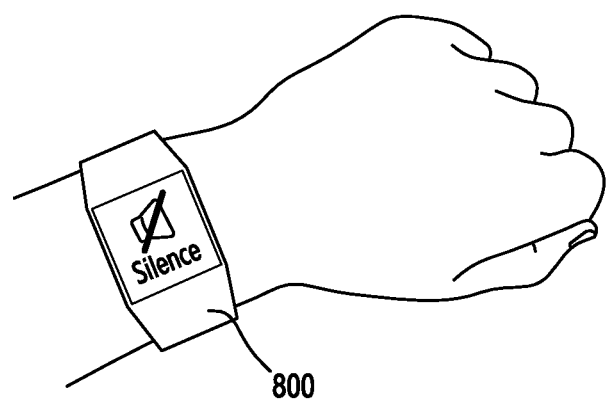
FIGS. 8A to 8C illustrate examples of a function executed depending on a fastening position of a wearable part according to various embodiments of the present disclosure.
Figure 8B:
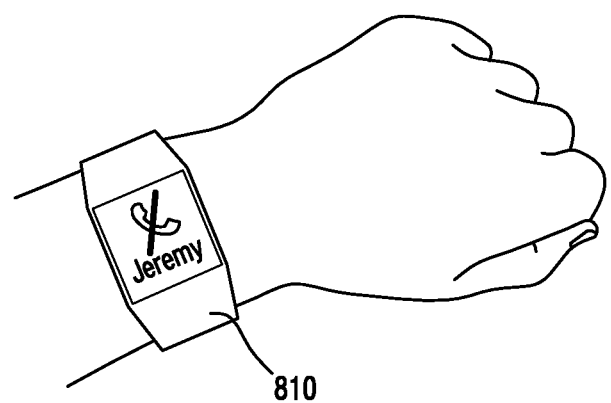
Figure 8C:
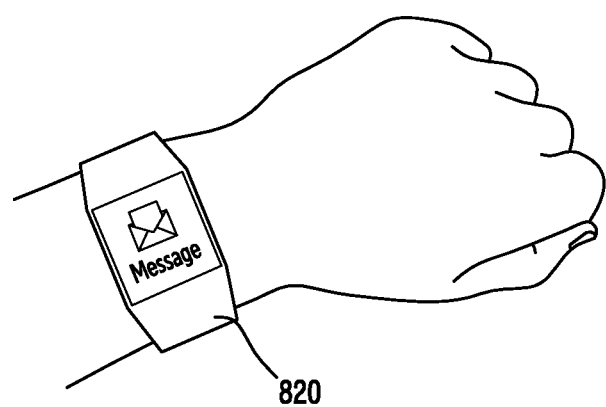

For example, as shown in FIG. 8A, an electronic device 800 can configure a sound output scheme to be silence. For example, as shown in FIG. 8B, an electronic device 810 can ignore a received phone call. For example, as shown in FIG. 8C, an electronic device 820 can execute various applications executing a text message application, or the like. That is, the electronic device can configure the sound output scheme to be silence according to the detected fastening position, or ignore a received phone call, and execute a specific application.

For example, the electronic device can execute an application configured according to the detected fastening position, and display a screen related to the configured application. The electronic device can execute the application related to a sport according to the detected fastening position. The electronic device can execute the application related to an office according to the detected fastening position. In addition, an application related to various subjects, such as a meeting, a schedule, weather, a map, a travel, and a location search, can be executed.

Figure 9:
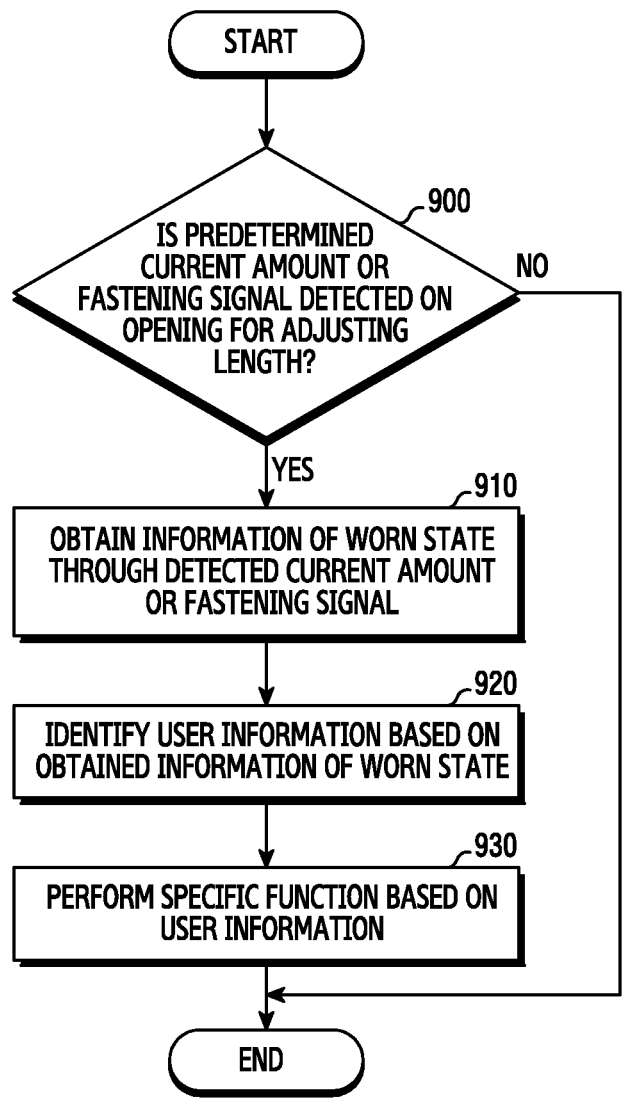
FIG. 9 is a flowchart illustrating a method of performing a specific function corresponding to a fastening position of a wearable part of an electronic device according to various embodiments of the present disclosure.

FIG. 9 is a flowchart illustrating a method of performing a specific function corresponding to a fastening position of a wearable part of an electronic device according to various embodiments of the present disclosure. Referring to FIG. 9, in operation 900, an electronic device can identify whether a current amount or a fastening signal, which is predetermined on the openings for adjusting a length, has been detected. For example, when each of the openings for adjusting the length formed in the wearable part of the electronic device has been fastened to a fixing pole, each of the openings for adjusting the length can be designed to allow a predetermined current amount to flow configure a predetermined resistance value to the each of the openings for adjusting the length) or a predetermined fastening signal (e.g., an electromagnetic signal) to occur.

When the predetermined current amount or the predetermined fastening signal in the openings for adjusting the length has been detected, in operation 910, the electronic device can obtain information of a worn state through the detected current amount or fastening signal. For example, when the electronic device has detected the predetermined current amount or the predetermined fastening signal in the openings for adjusting the length, it can be recognized that the electronic device is worn on apart of a user's body.

In operation 920, the electronic device can identify user information based on the obtained information of the worn state. For example, when the fixing pole of the electronic device has been fastened to a first position of a wearable part, the electronic device can determine that a child wears the electronic device, and when the fixing pole of the electronic device is fastened to a second position of the wearable part, the electronic device can determine that an adult wears the electronic device.

According to an embodiment, the electronic device can search for predetermined user information in a database of the electronic device or a database of a server based on the obtained information of the worn state. For example, when the obtained information (e.g., a current amount or fastening signal) of the worn state satisfies first user information, the electronic device can search for information on a first user profile.

In operation 930, the electronic device can perform a specific function based on user information. For example, when it is determined that the child wears the electronic device, the electronic device can display a user interface related to the child and execute an application related the child. Further, when it is determined that the adult wears the electronic device, the electronic device can display a user interface related to the adult and execute an application related to the adult.

According to an embodiment, when searching for predetermined user information in the database, the electronic device can transmit information on a corresponding user profile to the external electronic device. In addition, when searching for predetermined user information in the database, the electronic device can execute a predetermined function or application.

According to an embodiment, when the electronic device cannot find the predetermined user information in the database, the electronic device can provide a security service of the electronic device by additionally applying a step of providing content according to a security level.

Figure 10:
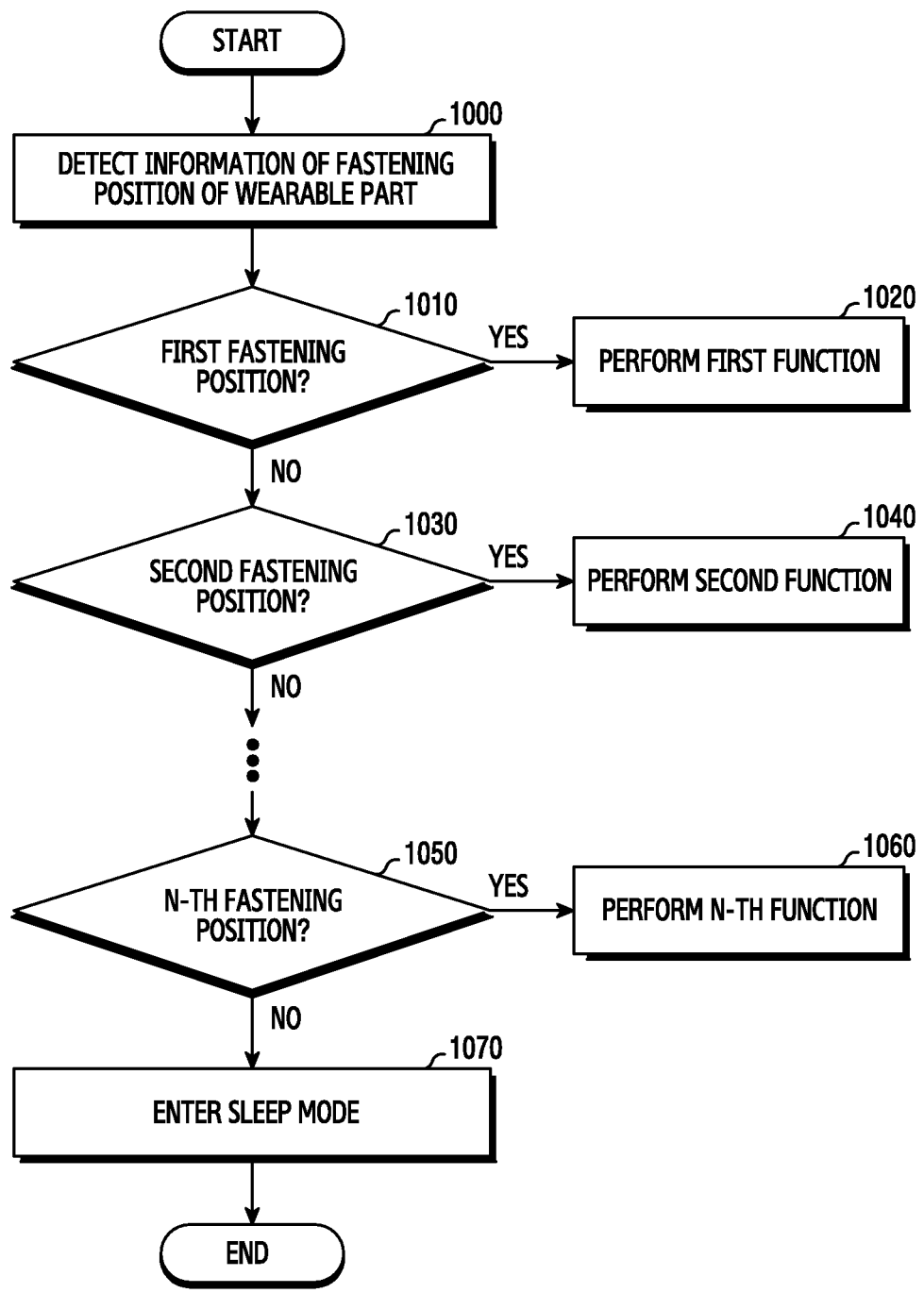
FIG. 10 is a flowchart illustrating a method of performing a specific function corresponding to a fastening position of a wearable part of an electronic device according to various embodiments of the present disclosure.

FIG. 10 is a flowchart illustrating a method of performing a specific function corresponding to a fastening position of a wearable part of an electronic device according to various embodiments of the present disclosure. Referring to FIG. 10, in operation 1000, an electronic device can detect information of a fastening position of a wearable part. For example, the electronic device can detect a current amount or a fastening signal when a fixing pole of the wearable part is fastened to an opening for adjusting a length.

In operation 1010, the electronic device can determine whether a fastening position corresponds to a first fastening position through the detected information of the fastening position. For example, the first fastening position can be a fastening position which is close to a main body of the electronic device. That is, the user can be in a state where the user tightly wears the electronic device.

When it is determined that the fastening position corresponds to the first fastening position, in operation 1020, the electronic device can perform a first function. For example, when it is determined that the fastening position corresponds to the first fastening position, the electronic device can execute a configured application. For example, when it is determined that the user has tightly worn the electronic device, the electronic device can execute an application related to an office.

When it is not determined that the fastening position corresponds to the first fastening position, in operation 1030, the electronic device can determine whether the fastening position corresponds to a second fastening position, through the detected information of the fastening position. For example, the second fastening position can be a fastening position which is in a distance longer than a distance between the main body and the first fastening position.

When it is determined that the fastening position corresponds to the second fastening position, in operation 1040, the electronic device can perform a second function. For example, when it is determined that the fastening position corresponds to the second fastening position, the electronic device can execute a configured application (e.g., a travel application, a schedule application, and a weather application).

When it is not determined that the fastening position corresponds to the second fastening position, in operation 1050, the electronic device can determine whether the fastening position corresponds to an N-th fastening position, through the detected information of the fastening position. For example, the N-th fastening position can be a fastening position of a wearable part which is a long way from the main body. That is, the user can be in a state where the user loosely wears the electronic device.

When it is determined that the fastening position corresponds to the N-th fastening position, in operation 1060, the electronic device can perform an N-th function. For example, when it is determined that the fastening position corresponds to the N-th fastening position, the electronic device can execute a configured application. For example, when it is determined that the user has loosely worn the electronic device, the electronic device can execute an application (e.g., a health care application) related to a sport.

When it is not determined that the fastening position corresponds to the N-th fastening position, in operation 1070, the electronic device can enter into a sleep mode. According to an embodiment, when it is determined that the user did not wear the electronic device, the electronic device can enter into the sleep mode.

According to various embodiments, the electronic device can execute the application according to each fastening position, but it is not limited thereto. For example, the electronic device can add or configure various functions performed according to the fastening position.

According to various embodiments of the present disclosure, various types of electronic devices, such as a smart phone, a tablet PC, or the like, promptly output predetermined location information corresponding to identification information of a beacon signal received from a beacon transmitter within a geo-fence, through video, audio, text, a map image, or the like, and can execute a predetermined function corresponding to the identification information of the beacon signal.

In addition, communication traffic between the electronic device and a server can be reduced. Furthermore, the location of a user who uses the electronic device can be prevented from being exposed, and thus, privacy of the user can be protected.

The methods according to various embodiments of the present disclosure can be implemented in the form of hardware, software, or any combination of hardware and software. In the implementation of software, a computer-readable storage medium (e.g., a non-transitory computer-readable storage medium) for storing one or more programs (i.e., software modules) can be provided. Programs stored in the computer-readable storage medium can be configured for execution by one or more processors within the electronic device. Programs can include instructions that cause the electronic device to perform the methods according to various embodiments of the present disclosure as defined by the appended claims or disclosed herein.

Programs (i.e., software modules or software) can be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the can form a memory in which the program is stored. Further, a plurality of such memories may be included in the electronic device.

In various embodiments of the present disclosure as described above, an element or elements may be expressed in a singular form or plural form according to the presented embodiments. However, the singular form and plural forms are selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a main body including at least one display;
a wearable part connected to at least a part of the main body;
a detector detecting information of a fastening position of the wearable part; and
at least one processor configured to:
identify a user based on the detected fastening position,
adjust a user interface of the electronic device to correspond to an electronic user profile associated with the user, based on the detected fastening position, and
display the user interface on the display and execute an application of the electronic device based on the electronic user profile corresponding to the detected fastening position.

2. The electronic device of claim 1, wherein the detector comprises:
at least one opening for adjusting a length, located at a first portion of the wearable part; and
a fixing pole located at a second portion of the wearable part.

3. The electronic device of claim 2, wherein the fixing pole detects the information of the fastening position of the at least one opening for adjusting the length when inserted to the at least one opening.

4. The electronic device of claim 3, wherein the fixing pole includes a resistance sensor to detect a resistance value of the at least one opening.

5. The electronic device of claim 3, wherein the fixing pole includes a capacitance measurement sensor to detect a capacitance of the at least one opening.

6. The electronic device of claim 3, wherein the fixing pole includes a hall sensor to detect a magnetic strength of a magnet located at the at least one opening.

7. The electronic device of claim 1, wherein the at least one processor is further configured to:
change a sound output mode based on the detected fastening position;
ignore an incoming phone call; and
execute an application.

8. The electronic device of claim 1, wherein the at least one processor is configured to identify the electronic user profile based on the detected fastening position, and transmit the electronic user profile to an external electronic device.

9. The electronic device of claim 8, wherein the at least one processor is configured to control an operation of the external electronic device based on the electronic user profile transmitted to the external electronic device.

10. The electronic device of claim 1, wherein the at least one processor is configured to configure a function corresponding to the detected fastening position.

11. The electronic device of claim 1, wherein the electronic user profile comprises at least one of a name, a contact number, an age, a home address and an office address of a user of the electronic device, a user interface for each user, or guardian information of the user of the electronic device.

12. The electronic device of claim 1, wherein, when information of the fastening position of the wearable part is not detected, the at least one processor is configured to enter into a sleep mode.

13. A method for operating an electronic device including a wearable part connected to at least a part of a main body, the method comprising:
detecting information of a fastening position of the wearable part;
identifying a user based on the detected fastening position;
adjusting a user interface of the electronic device to correspond to an electronic user profile associated with the user based on the detected fastening position; and
displaying the user interface on the display and executing an application of the electronic device based on the electronic user profile corresponding to the detected fastening position.

14. The method of claim 13, wherein the electronic device comprises:
an opening for adjusting a length, locating at a first portion of the wearable part; and
a fixing pole locating at a second portion of the wearable part.

15. The method of claim 14, wherein the detecting of the information of the fastening position comprises detecting the information of the fastening position of the opening for adjusting the length when the fixing pole is inserted to the opening for adjusting the length.

16. The method of claim 15, wherein the detecting of the information of the fastening position comprises detecting a resistance value of the at least one opening.

17. The method of claim 15, wherein the detecting of the information of the fastening position comprises detecting a capacitance of the at least one opening.

18. The method of claim 13, wherein the electronic user profile comprises at least one of a name, a contact number, an age, a home address and an office address of a user of the electronic device, a user interface for each user, or guardian information of the user of the electronic device.

19. The method of claim 13, further comprising performing at least one of:
   changing a sound output mode;
   ignoring an incoming phone call; and
   executing an application.

20. A non-transitory computer readable storage medium storing a program that, when executed by a processor, causes the processor to:
   detect information of a fastening position of a wearable part;
   identify a user based on the detected fastening position;
   adjusting a user interface of an electronic device to correspond to an electronic user profile associated with the user based on the detected fastening position; and
   display the user interface on the display and executing an application of the electronic device based on the electronic user profile corresponding to the detected fastening position.

* * * * *